United States Patent [19]

Inoue

[11] 4,379,042
[45] Apr. 5, 1983

[54] APPARATUS USING AN AXIALLY MOVING CONTINUOUS ELONGATED TOOL

[75] Inventor: Kiyoshi Inoue, Tokyo, Japan

[73] Assignee: Inoue-Japax Research Incorporated, Yokohama, Japan

[21] Appl. No.: 120,107

[22] Filed: Feb. 8, 1980

Related U.S. Application Data

[63] Continuation of Ser. No. 915,205, Jun. 13, 1978, abandoned.

[30] Foreign Application Priority Data

Jun. 14, 1977 [JP] Japan .................................. 52-70248
Jul. 5, 1977 [JP] Japan .................................. 52-80063
Aug. 16, 1977 [JP] Japan .................................. 52-98440

[51] Int. Cl.³ .......................... B23P 1/04; B23P 1/12; B28D 1/08
[52] U.S. Cl. .................. 204/224 M; 51/62; 51/328; 125/16 R; 219/69 W
[58] Field of Search ............... 51/62, 135 R, 142, 328; 125/12, 16 R, 19, 21; 219/69 W; 204/129.46, 206, 209, 224 M

[56] References Cited

U.S. PATENT DOCUMENTS

| | | | |
|---|---|---|---|
| 1,912,016 | 5/1933 | Sittner | 51/62 |
| 2,674,238 | 4/1954 | Dessureau et al. | 125/21 |
| 3,155,087 | 8/1964 | Dreyfus | 125/21 |
| 3,824,982 | 7/1974 | Bowman | 125/16 R |
| 3,831,576 | 8/1974 | Mech | 125/12 |
| 3,841,297 | 10/1974 | Mech | 125/12 |
| 3,849,624 | 11/1974 | Dulebohn et al. | 219/69 W |
| 3,942,508 | 3/1976 | Shimizu | 125/16 R |
| 4,081,652 | 3/1978 | Janicke et al. | 219/69 W |
| 4,123,645 | 11/1978 | Shichida et al. | 219/69 W |

FOREIGN PATENT DOCUMENTS 717874 8/1954 United Kingdom .............. 125/16 R
771622 4/1957 United Kingdom .................. 125/21

Primary Examiner—Stephen G. Kunin
Assistant Examiner—K. Bradford Adolphson
Attorney, Agent, or Firm—Karl F. Ross; Herbert Dubno

[57] ABSTRACT

A workpiece cutting apparatus in which an elongated wire or band tool spans a pair of guides and is continuously advanced relative to the workpiece by a first drive system but is reciprocated in the region of the workpiece by a second drive system at higher speed than the rate of continuous advance. This is permitted by storage devices between each guide and the first drive. The tool can carry out electrical machining and/or abrasive cutting using an abrasive bonded to the tool or in a machining fluid introduced into the cutting region.

7 Claims, 4 Drawing Figures

APPARATUS USING AN AXIALLY MOVING CONTINUOUS ELONGATED TOOL

This is a continuation of application Ser. No. 915,205, filed June 13, 1978, now abandoned.

FIELD OF THE INVENTION

The field to which the present invention relates is the shaping of a workpiece with a continuous elongated tool which is moved axially in a direction from one end to the other through a machining region in which the workpiece is juxtaposed therewith in the presence of a machining fluid. The invention relates, more particularly, to an improved method of apparatus for carrying out such shaping technique.

BACKGROUND OF THE INVENTION

In the shaping, cutting or machining, techniques with which the invention is concerned, a wire-type or band-type elongated tool has been hitherto employed which is composed of a high-tensile-strength material which may have abrasive particles or grit pre-bonded thereon by electrodeposition or other bonding process so as to serve as cutting or grinding edges on the periphery of the carrier wire or band against a workpiece which is brought into contact with and urged against the axially moving wire or band tool. Alternatively, abrasive grits may be used in suspension in a machining fluid which is introduced into a machining region comprised of an axially moving wire or band tool and a workpiece urged thereagainst to undergo mechanical abrading actions by the suspended abrasive grit. It has also been proposed to use an electrically conductive wire or band as an axially travelling electrode in electrical-discharge or electrolytic machining processes with the machining fluid being constituted by a liquid dielectric or a liquid electrolyte. These latter processes may be carried out individually or in combination through the use of a suitable machining fluid and, also in combination with the use of abrasives prebonded to the electrode or in the form of a suspension as described. As the cutting proceeds, the workpiece is displaced relative to the moving wire or band tool along a prescribed path to impart to the workpiece a desired cut or shape.

SUMMARY OF THE INVENTION

The invention also provides an improved apparatus for shaping a workpiece with an axially moving continuous elongated tool, comprising a supply reel for feeding the continuous elongated tool at a predetermined rate; a take-up reel for winding up the continuous elongated tool under tension at a predetermined rate; a pair of guide members disposed across a cutting region between the supply and take-up reels in the path of the continuous moving elongated tool for guiding same; means for successively storing under tension the continuous elongated tool through a first zone between the supply reel and one of said guide members and a second zone between said take-up reel and the other guide member; and means for reciprocating said continuous elongated tool between the guide members at a rate of movement which is higher than the take-up movement of the elongated tool and with a stroke determined by the extent of storage of the tool by said storing means.

BRIEF DESCRIPTION OF THE DRAWING

These and other features of the invention, as well as advantages thereof, will become more readily apparent from the following description made with reference to the accompanying drawing in which.

SPECIFIC DESCRIPTION

Figure 1:
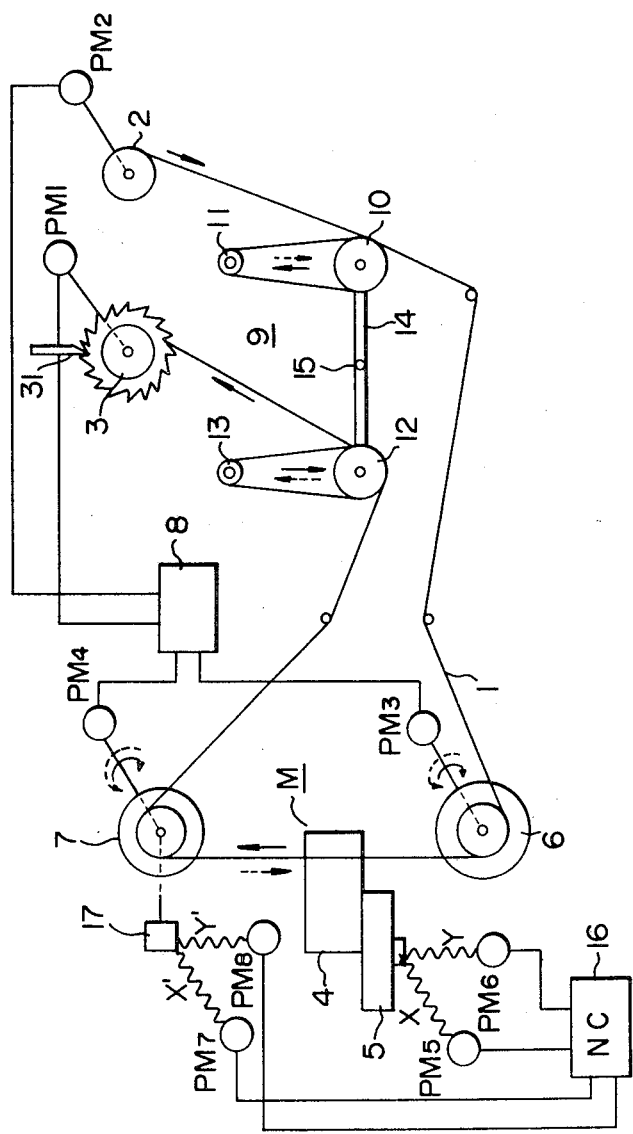
FIG. 1 is a schematic view diagrammatically illustrating an embodiment of the invention.

In FIG. 1, a continuous elongated tool 1 is shown to be fed from a supply reel 2 and wound up on a take-up reel 3 after traversing a cutting region M in which a workpiece 4 is disposed mounted upon a work table 5. The tool 1 which may be in the form of a wire or band is typically composed of piano wire, tungsten, copper, brass copper-zinc-tin alloy or the like thermally and electrically conductive material and has a diameter of 0.1 to 1 mm. Where the workpiece 4 is to be machined at least in part by mechanical abrading actions, the tool 1 makes use of abrasive particles prebonded on the periphery thereof or, alternatively, abrasive particles suspended in a machining fluid to be carried into the machining region M. Such abrasive particles are typically composed of diamond, WC, $B_4C$, BN, SiC, $ZrO_2$, $Al_2O_3$ or the like abrasive material which may be attached on the tool 1 by electrodeposition with Ni, Cu or the like electrically conductive substance or by any other bonding technique, or alternatively may directly be used in suspension in the machining fluid.

Figure 2:
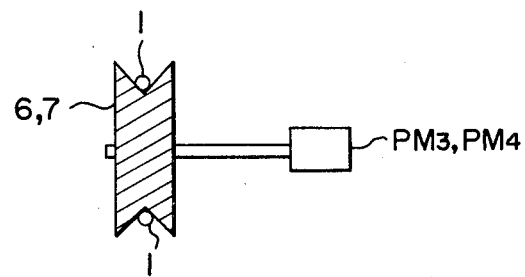
FIG. 2 is a schematic view partly in section diagrammatically illustrating portions of the embodiment of FIG. 1.

In the path of the continuous elongated tool 1, which will hereinafter be sometimes referred to as a "wire", "wire tool" or "wire electrode" the meaning of which also encompasses a band or the other elongated body, there are provided guide members 6 and 7 across the machining region M for guiding and supporting the tool 1 under tension therebetween and are shown each in the form of a roller with a V-groove having a tool-contacting surface composed of a hard rubber, polyurethane, fluoride resin or the like hard frictional material for frictionally guiding the tool (FIG. 2).

In order to continuously feed the tool 1 from the supply reel 2 to the take-up reel 3 at a relatively low velocity, say, of 0.1 to 5 meters/minute, there are provided motors, preferably pulse motors, PM1 and PM2, for driving the take-up reel 3 and the supply reel 2, respectively, with the motors PM1 and PM2 being controlledly energized by a control unit 8 so as to cause the continuous elongated tool 1 to travel while being taut under a suitable tension from the supply reel 2 to the take-up reel 3.

Shown at 31 is a rotation-reversal arrester clutch. Where the tool 1 is moved in the opposite direction, the reels 2 and 3 serve, of course, as take-up and supply reels, respectively.

In the transport path of the continuous elongated tool 1, there is also provided a successive tool storage unit 9 comprising a movable roller 10 and a fixed roller 11 associated therewith, and a second movable roller 12 and a second fixed roller 13 associated therewith. Thus, the tool 1 supplied from the reel 2 first runs on the pair of rollers 10 and 11 and, past the machining region M between the guide members 6 and 7, is fed to run on the second pair of rollers 12 and 13 and finally wound up on the reel 3.

The movable rollers 10 and 12 coupled together by a rotary arm 14 and disposed at its opposite ends. The arm 14 has a pivot 15 at its center on which it is swingable so as to counterbalance tensions upon the moving wire 1 at its both sides.

The guide rollers 6 and 7 are adapted to be rotated by motors preferably pulse motors, PM3 and PM4 to axially reciprocate the wire tool 1 stretched therebetween. The rotation of the motors PM3 and PM4 is controlled by the control unit 8 to produce the axial reciprocation of the wire tool 1 at a relatively high velocity, say, of 5 to 30 meters/second.

The work table 5 carrying the workpiece 4 is displaced in an X-Y plane by an X-axis motor, preferably pulse motor, PM5 and a Y-axis motor, preferably pulse motor, PM6 under the command of a numerical-control unit 16 so that the cutting of the workpiece 4 by the tool 1 is effected in a predetermined pattern preprogrammed therein. With motors PM5 and PM6 constituted each by a pulse or stepping motor, it is advantageous to incrementally drive or displace the workpiece 4 relative to the wire tool 1 with an increment of displacement, say, of 1 to 5 microns or less per drive signal pulse applied to each motor.

One of guide members 7 is shown associated with a subsidiary table 17 which displaces it in an X'-Y' plane to give the moving wire 1 between the guide members 6 and 7 a predetermined inclination so that a taper cutting of the workpiece 4 can be performed. This displacement of the displaceable guide member 6 or 7 is effected by an X'-axis motor, preferably pulse motor PM7 and a Y'-axis motor, preferably pulse motor, PM8, both controlled by command signals from the numerical controller 16.

Cutting of the workpiece 4 with the moving continuous elongated tool 1 is effected by individual or combined mechanical abrading, electrolytic (or electrochemical) and electrical-discharge machining actions. When electrolytic machining is involved, a liquid electrolyte is supplied to the cutting region M from a fluid-supply unit or nozzle (not shown) while an ECM power supply (not shown) of the type well known in the art is provided with its one terminal electrically connected to the workpiece 4 and other terminal to the moving elongated tool 1 through a brush arrangement well known in the art. When electrical-discharge machining is involved, the machining fluid is replaced by a dielectric liquid such as a distilled water and the power supply is a suitable EDM power source for producing a succession of electrical discharges between the workpiece 4 and the moving wire tool 1.

In operation, the wire tool 1 is fed from the supply reel 2 and, under a suitable tension, is advanced between the guide members 6 and 7 to act to cut the workpiece 4 and is eventually wound on the take-up reel 6 of a relatively low rate of movement in the order already mentioned. On the way from the supply reel 2 to the guide member 6, the wire tool 1 is wound on rollers 10 and 11 in one or more turns where it is permitted to be stored over a predetermined length. Likewise, on the way from the guide member 7 to the take-up reel 3, the wire tool 1 is wound on rollers 12 and 13 in one or more turns where it is stored.

While the wire tool 1 is being advanced from the supply reel 2 to the take-up reel 3 at a low velocity by the operation of the motors PM1 and PM2 under command of the control unit 8, the latter also operates the pulse motors PM3 and PM4 so that the guide members 6 and 7 driven thereby synchronously rotate in one and the other directions alternately to reciprocate the wire tool 1 carried to the region thereof at a high velocity of 5 to 30 meters/second which is sufficiently higher than the continuous wire supply or take-up velocity of 0.1 to 5 meters/minute. Thus, when the wire 1 is rapidly moved in each such reciprocation cycle in the direction indicated by the solid arrow by the positive rotation of the motors PM3 and PM4, this rapid movement causes the movable roller 10 in the wire storage unit 9 to approach the fixed roller 11 to reduce their spacing while allowing the second movable roller 12 to move away from the second fixed roller 13 to increase their spacing when the rotary arm 14 is caused to rotate counter-clockwise until the positive rotation of the motors PM3 and PM4 is terminated by the control unit 8. In the second half (negative) cycle of each reciprocation, the motors PM3 and PM4 cause the wire 1 to rapidly move in the direction indicated by the broken arrow. This brings about a clockwise rotation of the arm 14 by causing the roller 12 to approach the roller 13 thus to release the portion of the wire 1 previously stored in these two rollers while permitting the roller 10 to move away from the roller 11 thus to cause a portion of the wire 1 from the supply reel 2 to be temporarily stored in the latter roller pair. Such cyclic operation of motors PM3 and PM4 allows a smooth axial reciprocation of the wire tool 1 in the machining region M at a sufficient speed without producing sagging in the tool transport path.

The improvement according to the invention thus provides a highly efficient use of an elongated tool and machining operations at a markedly enhanced efficiency, accuracy and cutting stability. Since the tool 1 is continuously renewed for consecutive machining by supply and take-up reels 2 and 3 to compensate for tool wear, variation of the cutting width corresponding to the width of the cutting edge which would otherwise occur is advantageously eliminated to yield highly accurate machining results and a possible breakage of the tool due to wear of the cutting edge is avoided so that an extremely stable and efficient machining operation is assured.

Figure 3:
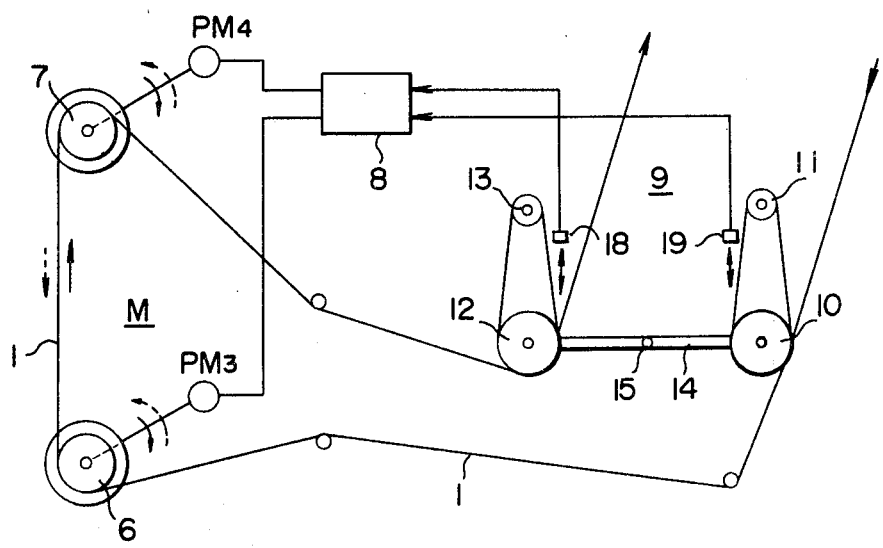
FIG. 3 is a schematic view diagrammatically illustrating a further embodiment of the invention.

In the arrangement of FIG. 3, the wire storage unit 9 is provided with switches 18 and 19 which are electrically, electromagnetically or optically responsive to the approaching displacement of movable rollers 12 and 10, respectively, each for providing a corresponding signal to the control unit 8 to switch over the rotary direction of the motors PM3 and PM4 for a cyclic operation of the tool axial reciprocation according to the invention.

Figure 4:
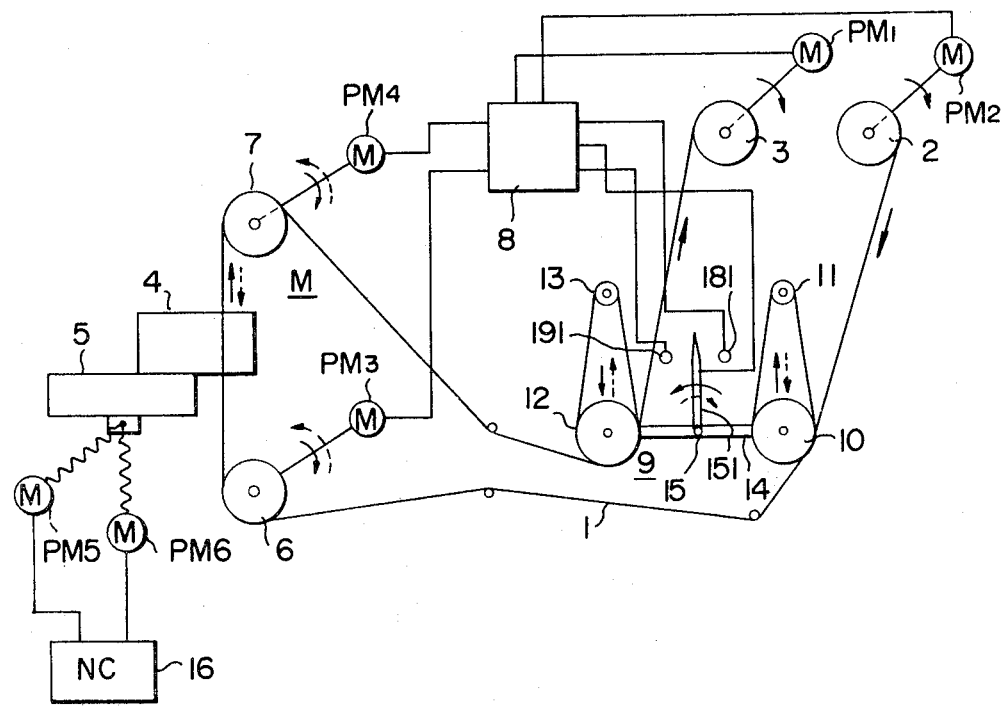
FIG. 4 is a diagrammatic illustration of a modification of the embodiment of FIG. 3.

In a modification of FIG. 4, a detector unit of the function provided in the embodiment of FIG. 3 is constituted by an electrically conductive kneedle 151 securely attached to the hinge 15 for swinging with the rotary motion of the arm 14 for contact with switch elements 181 and 191 to provide the control unit 8 with cyclic signals for the rapid axial reciprocation of the slowly unidirectionally moving continuous wire tool 1.

EXAMPLE

Various materials are machined with an arrangement which has been described and illustrated using a continuous piano wire of 0.2 mm diameter by (a) mechanical abrading with SiC abrasive grits pre-bonded by electro-deposition with copper to the wire tool; (b) mechanical abrading with the abrasive wire tool of (a) and further $Al_2O_3$ abrasive grits supplied in suspension with the machining fluid; (c) combined electrolytic and abrasive machining with the wire tool of (a) and by supply with a series of electric pulses of a pulse duration of 10 microseconds, a pulse interval of 20 microseconds and a peak current of 1.5 ampere and using a liquid electrolyte as machining fluid; and (d) combined electrolytic and abrasive machining similar to (c) with the exception of an additional use of $Al_2O_3$ abrasive grits supplied in suspension with the electrolyte. In each case, the wire tool is reciprocated at a velocity of 13 meter/second and is urged relatively against the workpiece at a force of 250 grams. Results are summarized in the table below.

| Workpiece Material | Removal Rate | | | |
| --- | --- | --- | --- | --- |
| | (a) mm/min | (b) mm/min | (c) mm/min | (d) mm/min |
| Cu | 0.08 | 0.09 | 0.55 | 0.6 |
| Fe (hardened) | 0.07 | 0.1 | 0.42 | 0.58 |
| WC | 0.09 | 0.09 | 0.5 | 0.6 |
| SKD | 0.08 | 0.1 | 0.4 | 0.63 |
| 18-8 stainless steel | 0.075 | 0.09 | 0.45 | 0.62 |

There is thus provided an improved shaping method and apparatus with an axially moving continuous elongated tool which carries out a cutting operation with an increased efficiency, stability and precision.

I claim:

1. An apparatus for shaping a workpiece with an axially moving continuous elongated tool, comprising:
    a supply reel for continuously feeding said continuous elongated tool at a predetermined rate of axial displacement in the range between 0.1 and 5 meters/minute;
    a take-up reel for winding up said continuous elongated tool under tension;
    a pair of guide members disposed across a cutting region between said supply and take-up reels in the path of said continuous elongated tool for guiding the same;
    means for successively storing under tension said continuous elongated tool through a first zone between said supply reel and one of said guide members and a second zone between the other guide member and said take-up reel;
    means for reciprocating said continuous elongated tool between said guide members at a predetermined rate of axial movement in the range between 5 and 30 meters/second and with a stroke determined within the storage stored by said storing means; and
    drive means including a pair of pulse motors (PM5, PM6) controlled by a numerical controller for displacing said workpiece in an X-Y plane relative to said reciprocating axially moving continuous elongated tool incrementally with an increment of displacement of 1 to 5 microns and along a predetermined path in said plane to machine a correspondingly shaped contour in the workpiece, said guide members comprising a pair of guide rollers and a pair of pulse motors (PM3, PM4) drivingly coupled to said guide rollers, respectively, and constituting said reciprocating means for rotating said guide rollers synchronously in one and the other directions alternately.

2. An apparatus for shaping a workpiece with an axially moving continuous elongated tool, comprising:
    a supply reel for continuously feeding said continuous elongated tool at a predetermined rate of axial displacement in the range between 0.1 and 5 meters/minute;
    a take-up reel for winding up said continuous elongated tool under tension;
    a pair of guide members disposed across a cutting region between said supply and take-up reels in the path of said continuous elongated tool for guiding the same;
    means for successively storing under tension said continuous elongated tool through a first zone between said supply reel and one of said guide members and a second zone between the other guide member and said take-up reel;
    means for reciprocating said continuous elongated tool between said guide members at a predetermined rate of axial movement in the range between 5 and 30 meters/second and with a stroke determined within the storage stored by said storing means;
    drive means including a pair of pulse motors (PM5, PM6) controlled by a numerical controller for displacing said workpiece in an X-Y plane relative to said reciprocating continuously moving continuous elongated tool incrementally with an increment of displacement of 1 to 5 microns and along a predetermined path in said plane to machine a correspondingly shaped contour in the workpiece, and
    subsidiary drive means associated with one of said guide members and constituted by a pair of pulse motors (PM7, PM8) controlled by said numerical controller for effecting displacement of said one guide member in an X'-Y' plane transverse to the axial direction of said moving elongated tool and substantially in parallel with said X-Y plane to permit a taper cutting of the workpiece, said guide members comprising a pair of guide rollers adapted to be driven by a pair of pulse motors (PM3, PM4), respectively, and synchronously in one and the other directions alternately.

3. The apparatus defined in claim 1 or claim 2 wherein said storage means includes at least a pair of movable and fixed rollers provided in the path between one of said supply and take-up reels and one of said guide members, said stroke in the axial reciprocation of said tool being determined by the maximum distance between said movable and fixed rollers, said supply reel and said take-up reel being driven by a pair of pulse motors (PM2, PM1).

4. The apparatus defined in claim 1 or claim 2 wherein said storage means includes in said first zone a first movable roller and a first fixed roller associated therewith and in said second zone a second movable roller and a second fixed roller, said first and second movable rollers being coupled together by an arm at its opposite ends with said arm rotatable on a hinge provided on its center, said continuous elongated tool fed from said supply reel being runningly wound on said first movable and fixed rollers and then past said guide members being runningly wound on said second movable and fixed rollers prior to take-up by said take-up reel driven by the associated pulse motor (PM1), said apparatus further comprising detector means responsive to displacement of each of said movable rollers approaching the corresponding fixed roller for providing a command signal to said pulse motors (PM3, PM4) for switching over the rotary direction of said guide rollers for rapid cyclic movement or reciprocation of said tool.

5. An apparatus for shaping a workpiece with an axially moving continuous elongated tool, comprising:
- a supply reel for providing said continuous elongated tool;
- a first pulse motor (PM2) for pulsively driving said supply reel to continuously unwind said continuous elongated tool thereon at a predetermined feed rate;
- a take-up reel;
- a second pulse motor (PM1) for pulsively driving said take-up reel to continuously wind up said continuous elongated tool under tension at a predetermined take-up rate;
- a pair of guide members disposed across a cutting region between said supply and take-up reels in the path of said continuous elongated tool for guiding the same;
- means for successively storing under tension said continuous elongated tool through a first zone between said supply reel and one of said guide members and a second zone between the other guide member and said take-up reel; and
- means for reciprocating said continuous elongated tool between said guide members at a rate of axial movement which is higher than that of said take-up movement of said elongated tool and with a stroke determined within the storage stored by said storing means, said guide members comprising a pair of guide rollers driven by a third and fourth pulse motor (PM3, PM4), respectively, constituting said reciprocating means and adapted to be driven synchronously in one and the other directions, alternately, said storage means including at least a pair of movable and fixed rollers provided in the path between one of said supply and take-up reels and one of said guide rollers, said stroke in the axial reciprocation of said tool being determined by the maximum distance between said movable and fixed rollers, said storage means including in said first zone a first movable roller and a first fixed roller associated therewith and in said second zone a second movable roller and a second fixed roller, said first and second movable rollers being coupled together by an arm at its opposite ends with said arm rotatable on a hinge provided on its center, said continuous elongated tool fed from said supply reel by means of said first pulse motor (PM2) being runningly wound on said first movable and fixed rollers and then past said guide members being runningly wound on said second movable and fixed rollers prior to take-up by said take-up reel by means of said second pulse motor (PM1).

6. An apparatus for shaping a workpiece with an axially moving continuous elongated tool, comprising:
- a supply reel for providing said continuous elongated tool;
- a first pulse motor (PM2) for pulsively driving said supply reel to continuously unwind said continuous elongated tool thereon at a predetermined feed rate;
- a take-up reel;
- a second pulse motor (PM1) for pulsively driving said take-up reel to continuously wind up said continuous elongated tool thereon under tension at a predetermined take-up rate;
- a pair of guide members disposed across a cutting region between said supply and take-up reels in the path of said continuous elongated tool for guiding the same;
- means for successively storing under tension said continuous elongated tool through a first zone between said supply reel and one of said guide members and a second zone between the other guide member and said take-up reel;
- means including a third and fourth pulse motor (PM3, PM4) for reciprocating said continuous elongated tool between said guide members at a rate of axial movement which is higher than said take-up rate of said elongated tool with a stroke determined within the storage stored by said storing means; and
- drive means for displacing with a fifth and sixth pulse motor (PM5, PM6) said workpiece relative to said reciprocatingly axially moving continuous elongated tool incrementally with an increment of displacement of 1 to 5 microns, said guide members comprising a pair of guide rollers driven by said third and fourth pulse motors (PM3, PM4), respectively, constituting said reciprocating means and adapted to be driven synchronously in one and the other directions alternately, said storage means including at least a pair of movable and fixed rollers provided in the path between one of said supply and take-up reels and one of said guide rollers, said stroke in the axial reciprocation of said tool being determined by the maximum distance between said movable and fixed rollers, said storage means including in said first zone a first movable roller and a first fixed roller associated therewith and in said second zone a second movable and fixed roller being coupled together by an arm at its opposite ends with said arm rotatable on a hinge provided on its center, said continuous elongated tool fed by means of said first pulse motor (PM2) from said supply reel being runningly wound on said first movable and fixed rollers and then past said guide members being runningly wound on said second movable and fixed rollers prior to take-up by said take-up reel by means of said second pulse motor (PM1).

7. The apparatus defined in claim 5 or claim 6, further comprising detector means responsive to displacement of each of said movable rollers approaching the corresponding fixed roller for providing a command signal to said third and fourth pulse motors (PM3, PM4) for switching over the rotary direction of said guide rollers for rapid cyclic movement or reciprocation of said tool.

* * * * *